United States Patent
Duttagupta et al.

(10) Patent No.: US 12,450,799 B1
(45) Date of Patent: Oct. 21, 2025

(54) MULTI-LANGUAGE PROGRAM AND DATA FLOW ANALYSIS USING LLM

(71) Applicant: Morgan Stanley Services Group Inc., New York, NY (US)

(72) Inventors: Kallol Duttagupta, Basking Ridge, NJ (US); Kumar Vadaparty, Belle Mead, NJ (US); Thomas Mathew, Parsippany, NJ (US); Vivek S. Agrawal, Princeton, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/080,275

(22) Filed: Mar. 14, 2025

(51) Int. Cl.
*G06T 11/20* (2006.01)
*G06F 8/41* (2018.01)

(52) U.S. Cl.
CPC ............ *G06T 11/206* (2013.01); *G06F 8/433* (2013.01)

(58) Field of Classification Search
CPC ............................. G06T 11/206; G06F 8/433
See application file for complete search history.

(56) References Cited

U.S. PATENT DOCUMENTS

| | | | |
|---|---|---|---|
| 11,321,066 B2 | 5/2022 | Yu et al. | |
| 11,698,829 B2 | 7/2023 | Aradhya et al. | |
| 12,360,791 B1 | 7/2025 | Vadaparty et al. | |
| 2022/0164170 A1 | 5/2022 | Benton et al. | |
| 2023/0305822 A1 | 9/2023 | Ferrucci et al. | |
| 2024/0045662 A1 | 2/2024 | Jain et al. | |
| 2024/0256235 A1* | 8/2024 | Potti | G06F 8/427 |
| 2024/0302600 A1 | 9/2024 | Huang et al. | |
| 2024/0311087 A1 | 9/2024 | Bathula | |
| 2025/0004760 A1 | 1/2025 | Maciel Dos Santos et al. | |
| 2025/0004915 A1 | 1/2025 | Rudenko et al. | |
| 2025/0013436 A1* | 1/2025 | Mohanty | G16H 50/70 |
| 2025/0063101 A1 | 2/2025 | Cegielski-Johnson et al. | |

\* cited by examiner

*Primary Examiner* — Michelle L Sams
(74) *Attorney, Agent, or Firm* — K&L Gates LLP

(57) ABSTRACT

A computer-implemented system analyzes program and data flows in a software system comprising code written in multiple programming languages using a generative large language model (LLM) directed by programming-language-specific prompts. The LLM identifies functional components within the code, generating labeled graph nodes that include a node type, a node name, and dependency information. A graph construction computer system processes the labeled graph nodes to generate a directed graph, where nodes represent functional components and directed edges represent dependencies. The system stores the graph in a database and provides a web-based interface for visualization, allowing users to explore, query, and analyze program and data flows across the software system. The system enables automated, language-agnostic dependency mapping, facilitating software analysis, debugging, and modernization.

16 Claims, 6 Drawing Sheets

```
{
  {
    "NODETYPE": "SP",
    "NODENAME": "sp_getUserDetails",
    "DEPENDSON": "TBL_USER_DETAILS",
    "DATA": {
      "USER_ID",
      "USER_NAME"
    }
  },
  {
    "NODETYPE": "TABLE",
    "NODENAME": "TBL_USER_DETAILS",
    "DEPENDSON": "NONE",
    "DATA": {
      ""
    }
  }
}
```

MULTI-LANGUAGE PROGRAM AND DATA FLOW ANALYSIS USING LLM

BACKGROUND

In today's rapidly evolving technological landscape, software systems are increasingly complex, often comprising components written in multiple programming languages. This complexity poses significant challenges in understanding program and data flows, crucial for effective maintenance, feature development, and continuous evolution to meet business needs. Traditional methods rely heavily on language-specific expertise, which is resource-intensive and inefficient, particularly as systems grow in complexity.

SUMMARY

In one general aspect, the present invention employs Generative AI Large Language Models (LLMs) as a transformative approach to understanding program and data flows in complex software systems. By leveraging LLMs, the present invention provides a novel system and method for analyzing multi-language software applications. It can facilitate a comprehensive understanding of program and data flows across diverse components, irrespective of the programming languages used. Embodiments of the present invention can not only reduce dependency on specialized human expertise but also enhance system supportability and modernization efforts. By converting code into a unified graph format, the system enables LLMs to deliver detailed insights, revolutionizing software management practices.

Using programming-language-specific prompts for different pieces of code of the software system/application, the LLM is directed to extract functional components from the software codebase for the application—such as UI elements, functions, web services, stored procedures, and database tables—regardless of the programming languages in which they are written. The programming-language-specific prompts also directed the LLM to process the source code to generated labeled graph nodes, each representing a distinct software component. The system then constructs a directed graph that visualizes dependencies between these components, allowing developers to better understand the structure, interactions, and data flows within the software system.

This AI-powered approach eliminates the need for custom static analysis tools or manual cross-language expertise, significantly improving the efficiency of software maintenance, debugging, and modernization. The system architecture is designed for scalability and flexibility, consisting of a frontend interface for user interaction, a backend computing system running the LLM and dependency analysis, and a graph construction engine that organizes and stores the structured representations in a graph database.

Beyond its core functionality, the present invention supports fine-tuning for domain-specific applications, such as financial services, by allowing the LLM to be trained on industry-specific datasets. Additionally, the system can dynamically adapt as new programming languages emerge, ensuring its long-term relevance.

By providing a clear and automated visualization of software architecture, the present invention can enable enterprises to accelerate software development, streamline legacy system modernization, enhance security analysis, and improve overall maintainability. With its ability to process diverse codebases at scale, the present invention represents a significant step forward in AI-assisted software engineering. These and other benefits that are realizable through embodiments of the present invention will be apparent from the description that follows.

FIGURES

Various embodiments of the present invention are described herein by way of example in conjunction with the following figures.

FIG. 5 depicts an example of the JSON text that the LLM of FIG. 2 could generate for a pair of nodes, according to various embodiments of the present invention.

Figure 2:
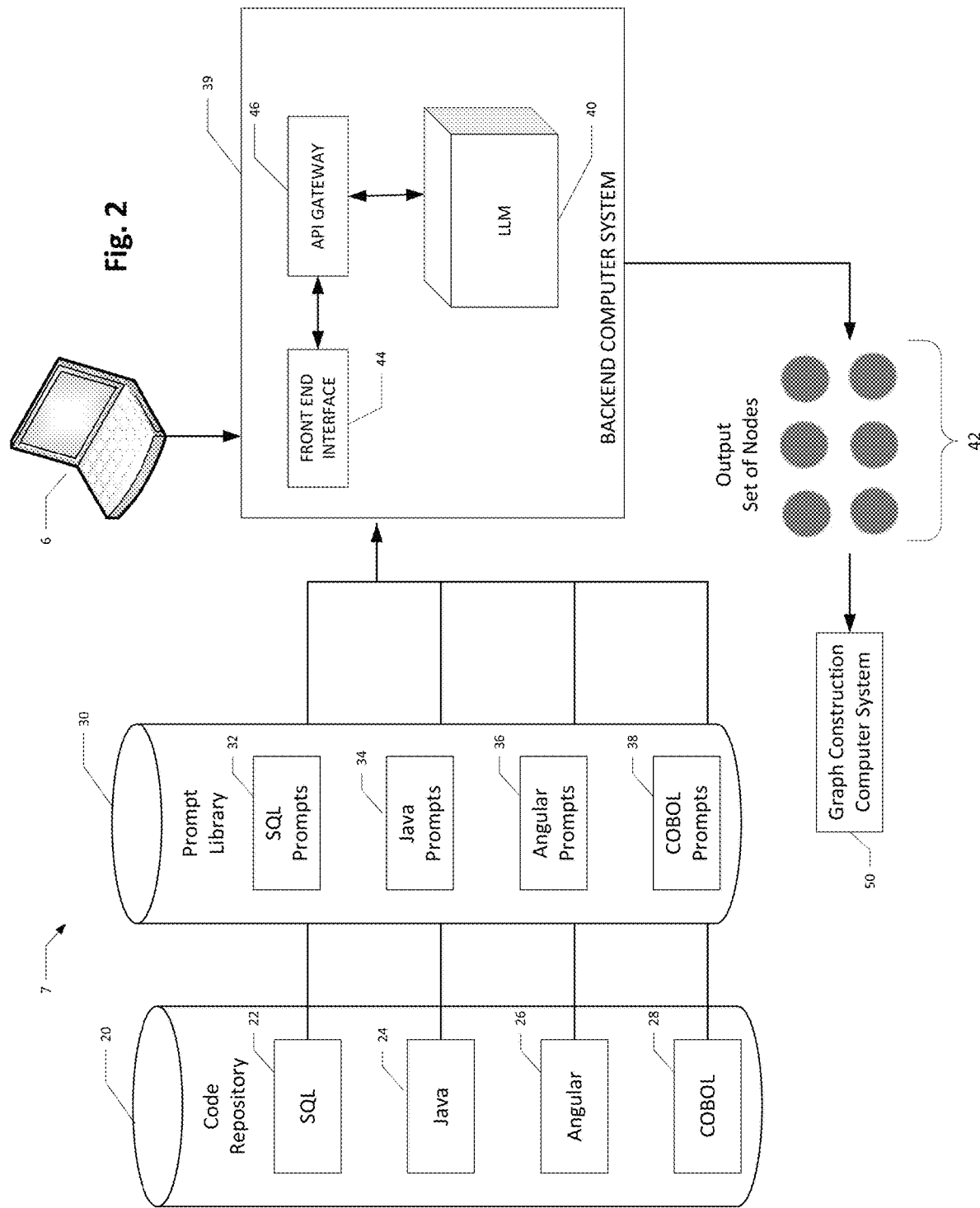
FIG. 2 is a diagram illustrating a system according to various embodiments of the present invention, where the system includes an LLM and generates data for a set of nodes for a software application using programming-language-specific prompt libraries.
Figure 6:
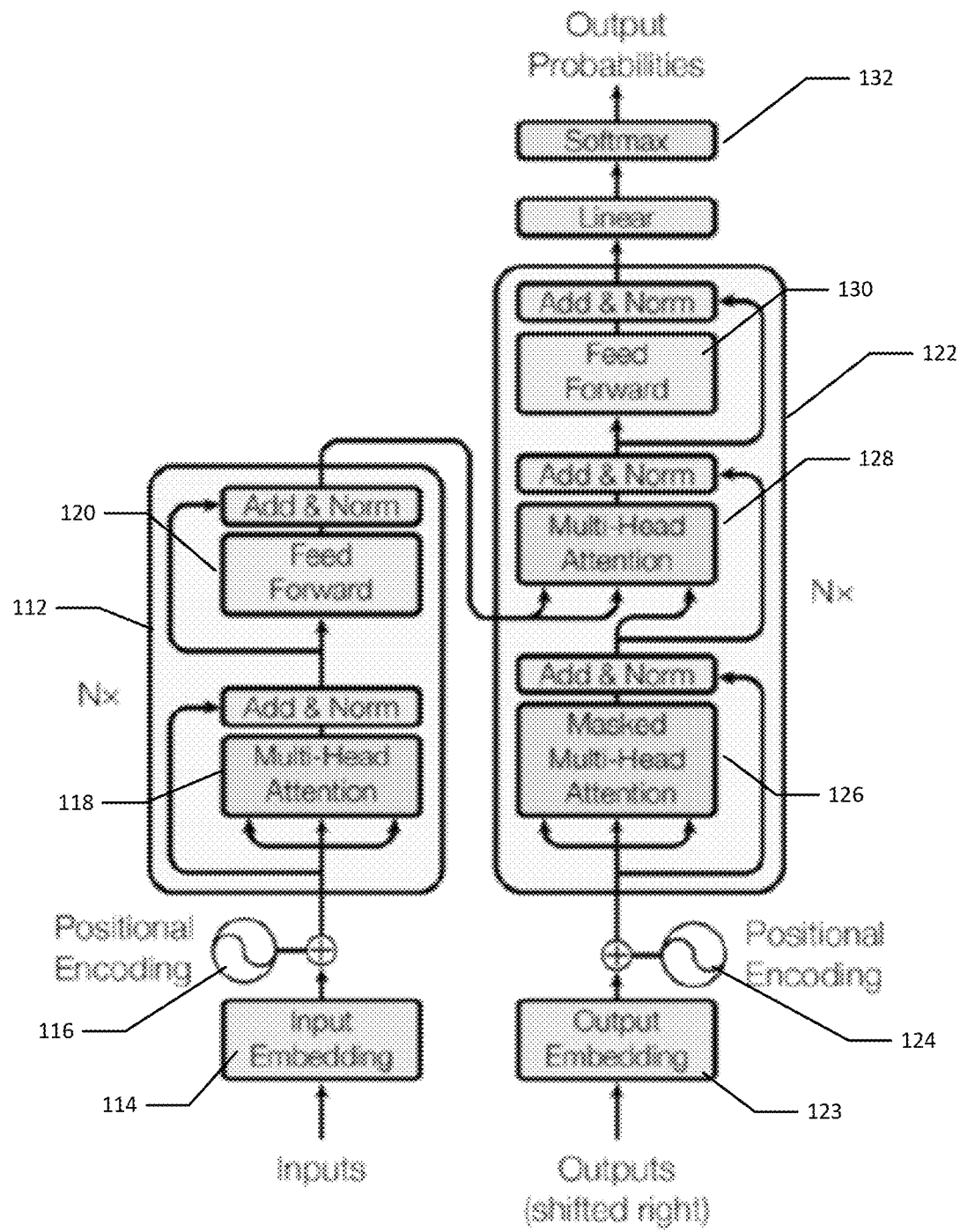

FIG. 6 is a diagram of a transformer that could be used in the LLM of FIG. 2 according to various embodiments of the present invention. The diagram is adapted from A. Vaswani et al., "Attention Is All You Need," Advances in Neural Information Processing Systems 30 (NIPS 2017), arXiv: 1706.03762.

DESCRIPTION

Figure 1:
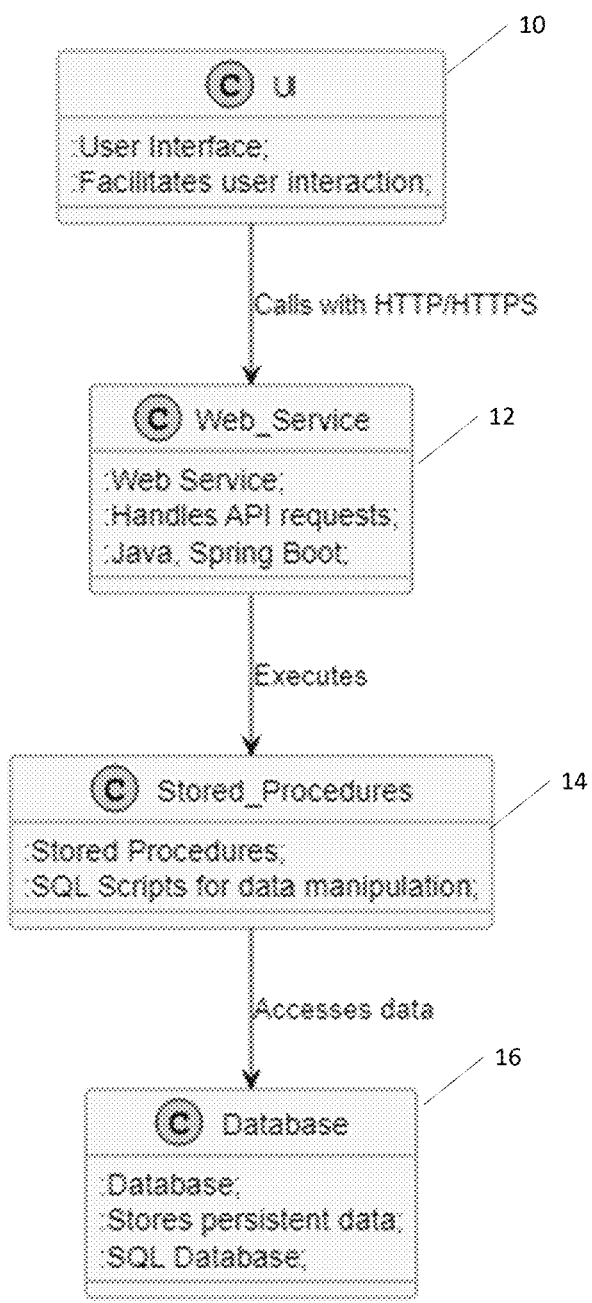
FIG. 1 is a diagram illustrating a software application that utilizes a variety of programming languages.

In the realm of software development, especially within large-scale institutions, applications are often constructed using a variety of programming languages. With reference to the example of FIG. 1, each language typically handles a different segment of the application's architecture, such as user interfaces 10, middle-tier logic (including web services 12 and stored procedures 14), and database management 16. This diversity, while robust, introduces significant challenges in terms of application maintenance, feature development, and system modernization due to the intricate understanding required of each language's role within the overall system. Traditionally, addressing these challenges involves the coordination of multiple subject matter experts (SMEs) each specializing in a different programming language. This approach is not only resource-intensive but also slow and inefficient, particularly as system complexity escalates. There is a need for a more streamlined, efficient method to understand and manage these complex systems without the heavy reliance on language-specific expertise.

Various embodiments of the present invention utilize Generative AI Large Language Models (LLMs) to achieve a comprehensive understanding of both program flow and data flow across the various components of these multilingual and multifaceted software systems. By leveraging LLMs, embodiments of the present invention are capable of reverse engineering each component of the software system, irrespective of the programming language used.

FIG. 2 is a block diagram depicting aspects of an example embodiment of the present invention. The system 7 illustrated in FIG. 2 comprises a code repository 20 that stores software code used by the software system(s) of an enterprise, which can include code written in different programming languages, such as, as shown in the example of FIG.

2, SQL code 22, Java code 24, Angular code 26, and COBOL code 28. The example system 7 of FIG. 2 also comprises a prompt library 30, which comprises programming-language-specific prompts used by the LLM 40. And it comprises a back-end computer system 39 that comprises the LLM 40. Before describing how the LLM 40 utilizes the code repository 20 and prompt library 30 according to embodiments of the present invention, a brief description of the backend computer system 39 is provided. A user at a user computer device 6 communicates with the backend computer system 39 via an electronic data network (not shown), such as the Internet, where the backend computer system 39 comprises the LLM 40. The LLM 40 is a generative AI system that is trained, through machine learning, to generate an output based on inputs to the LLM 40. As described herein, the inputs can comprise code in the code repository 20 and the programming-language-specific prompts in the prompt library 30. The prompts direct the LLM 40 to identify functional components of a software system of the enterprise, where the code for the software system is stored in the code repository 20. The identified functional components can be identifiable units of the source code for the software system that perform a distinct function within the software system, and where each functional component operates within a defined scope and adheres to syntactic and semantic rules of its respective programming language. The functional components could be, for example, UIs, methods, programs in specific programming languages, web services, stored procedures, or tables. The prompts can also direct the LLM to output labeled graph nodes 42, with each graph node corresponding to a unique functional component identified by the LLM 40 in the software system. The LLM 40 could be, for example, one of OpenAI's GPT series of models (e.g., GPT-3.5, GPT-4, GPT-4 Turbo and GPT-4o used in ChatGPT), BERT (Bidirectional Encoder Representations from Transformers), ROBERTa (A Robustly Optimized BERT Pretraining Approach), PaLM (Pathways Language Model) and Gemini (Gemini AI 1.5 or 1.0 models), or some other suitable LLM. FIG. 6, described further below, provides more details about an example structure for the LLM 40.

The user computer device 6 can communicate with the LLM 40 via a front-end interface 44 that interacts with the LLM 40 via an API gateway 46, for example. The end user, at the user computer device 6, can interact with the LLM 40 through a user interface, which can be a web application, a mobile app, a chat widget embedded in a website, or a desktop application, for example. This UI can provide a text input field where users can type their queries or prompts, and the UI can also have a display area where the responses from the LLM are shown or from where the output (such as the graph nodes 42, described further below) can be downloaded to the user computer device 6. The UI can also provide an interface for the user to select prompts from the prompt library 30 for the LLM 40 to use in generating its output. The front-end interface 44 can be implemented with a web server that hosts the user interface and handles the initial HTTP requests from the user's device 6. The API gateway 46 can route the user's inputs/prompts to the LLM 40 and, once the LLM 40 generates a response, route the response to the front end interface 44 for sending on to the user device 6. API gateway 46 can serve as a single entry point for all client requests, simplifying the interaction between the clients and the LLM 40. The API gateway 40 can be implemented with a software layer that can be deployed as a server of the backend computer system 39. To the end, the backend computer system 39 can be implemented multiple servers, such as in a cloud computing environment.

Both the code repository 20 and the prompt library 30 are also in communication with the backend computer system 39 via an electronic data network (e.g., the Internet). For example, the code repository 20, the prompt library 30, and the user computer device 6 could all be connected to an on-premises network of the enterprise, and that on-premises network can be in communication with the backend computer system 39 via the Internet.

The code repository 20 may store code for a single software system of the enterprise or for multiple software systems of the enterprise. The code repository 20 may comprise a Git repository, for example, using a content-addressable file system, e.g., objects (files, directories, commits) are stored and retrieved based on their content, using cryptographic hash functions. Of course, the programming languages identified in FIG. 2 (SQL, Java, Angular and COBOL) are examples and embodiments of the present invention could be used with different, additional, or fewer programming languages.

The prompt library 30 may be a library of programming-language-specific prompts 32, 34, 36, 38 that the user 6 can select for use with the LLM 40, as described further herein. These prompts can be meticulously crafted, by SMEs for example, to guide the LLM 40 in identifying and understanding the intricate ways in which different pieces of code (e.g., the code stored in the code repository 20) interact within an application of the enterprise. For instance, consider a scenario where a user interface function calls another UI function, which subsequently makes a call to a web service at the middle tier on a server. The prompts can enable the LLM 40 to trace these interactions accurately, recognizing the sequence and nature of calls across different layers of the application. This capability facilitates the unraveling the complex web of interactions that characterize modern software systems. Via the prompts, the LLM 40 can detect calls and data flows in the enterprise's software system, as well as the relationships between various programs used in the complex software system. Using the prompts, the LLM 40 can capture these dependencies and relationships in the graph nodes 42 as a first step of the inventive process.

As the example of FIG. 2 shows, there can be a set of prompts 32, 34, 36, 38 for different programming languages; preferably there is a set of prompts for each programming language in the code repository 20. The prompt library 30 could be implemented with a database (e.g., PostgreSQL, MySQL, MongoDB). A web application or API can acts as an intermediary between the front end interface 44, the prompt library 30, and the LLM 40.

In a first step of the process, the present invention focuses on capturing the intricate dependencies and relationships within the software system. This is accomplished using the LLM 40, which obviates the need for writing custom code for each programming language. The LLM 40 can understand the subtleties and nuances of various programming languages, enabling the LLM 40 to detect call and data flows in the software system's code with remarkable precision. This capability facilitates identifying how different components of the software system interact with one another, regardless of the languages in which they are written.

For each identified dependency or data flow, a corresponding node is created for inclusion in a unified graph model of the software. This graph can serve as a universal representation of the software system, abstracting language-specific nuances into a cohesive framework that transcends individual programming languages. The nodes in this graph model can represent distinct functions, methods, or data exchanges, encapsulating both the structural and functional aspects of the code. By doing so, the present invention can effectively translate the diverse elements of a multilingual software system into a single, coherent model.

This abstraction is helpful in providing a clear and comprehensive view of the software system's architecture. It allows for the visualization of complex interactions and dependencies that might otherwise be obscured by the intricacies of different programming languages. By leveraging the LLM 40, the present invention, in various embodiments, efficiently maps out the foundational elements of the software system, setting the stage for a more detailed analysis in subsequent steps. This foundational mapping is helpful for understanding the software system's operation across its various layers, facilitating maintenance, troubleshooting, and modernization efforts.

In the second step, the present invention can build upon the foundational graph model established in the first step by focusing on the relationships between the nodes. These nodes, which represent the dependencies and data flows identified by the LLM 40, can be traversed using a software-implemented graph construction algorithm, run by a graph construction computer system 50, to uncover and define the intricate relationships between the nodes. The graph construction algorithm implemented by the graph construction computer system 50 can systematically analyze the nodes 42 to establish connections between nodes that reflect the true operational dynamics of the software system. The LLM 40 can label each node 42 with attributes such as a name for the node, a type of node, and other node(s) that it depends on (e.g., inputs to the node). The prompts in the prompt library 30 can prompt the LLM 40 to discover the nodes and their associated attributes.

The graph construction algorithm can iterate through each node and use its attributes to create the directed edges for the graph. The nodes 42 generated by the LLM 40 could be in CSV or JSON text files for example, that are input (e.g., via an API) from the LLM 40 to the graph construction algorithm to construct the graph. The graph construction computer system 50 could be the user computer device 6 or some other computer system of the enterprise, either on-premises or in a cloud computing environment.

The graph construction algorithm can examine the nodes 42 and their attributes (e.g., the labels), to identify potential interactions and dependencies that may not be immediately apparent. It can consider various factors such as function calls, data exchanges, and control flows, ensuring that all relevant interactions are captured. As the algorithm traverses the graph, it creates edges between nodes, effectively mapping out the relationships that define the software system's architecture. These edges can represent the pathways through which data and control signals flow in the software system, such that the graph provides a detailed map of the software system's operational landscape.

By transforming the abstract nodes into a network of interconnected elements, the system creates a comprehensive model that reflects the application's true structure and behavior. This model can be valuable for understanding complex software systems, as it reveals hidden dependencies and interaction patterns that are crucial for effective maintenance and modernization. The detailed mapping enables developers to visualize the entire system, facilitating tasks such as troubleshooting, optimization, and the integration of new features. Ultimately, this step empowers organizations to manage their software ecosystems with greater insight and efficiency, paving the way for more agile and informed decision-making.

Figure 3:
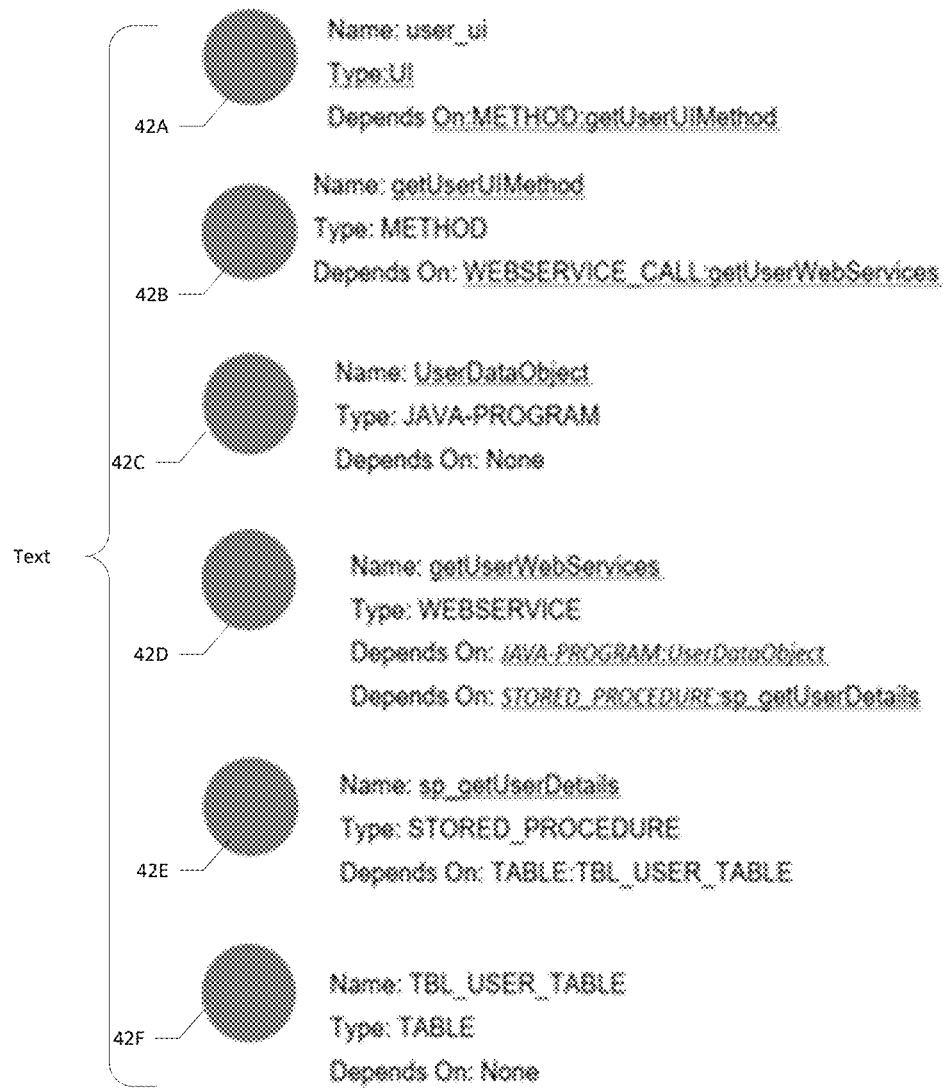
FIG. 3 depicts an example set of nodes generated by the LLM of FIG. 2 according to various embodiments of the present invention.

FIG. 3 shows some example nodes 42A-F with their corresponding attributes as determined by the LLM 40. As shown in the example of FIG. 3, each node can include a number and a type of node, such as, for example, UI, method, program in a certain programming language (e.g., Java), webservice, stored procedure, or table, to name a few. Each node can also identify what it depends on, such as by type of node and node name. For example, node 42A depends on a method called "getUserUIMethod," which corresponds to node 42B. And node 42B depends on a web service call "getUserWebServices," which corresponds to node 42D. In the illustrated example, node 42D depends on two nodes, node 42C and node 42D. Node 42F represents a table that does not depend on another node, but node 42E depends on it.

Figure 4:
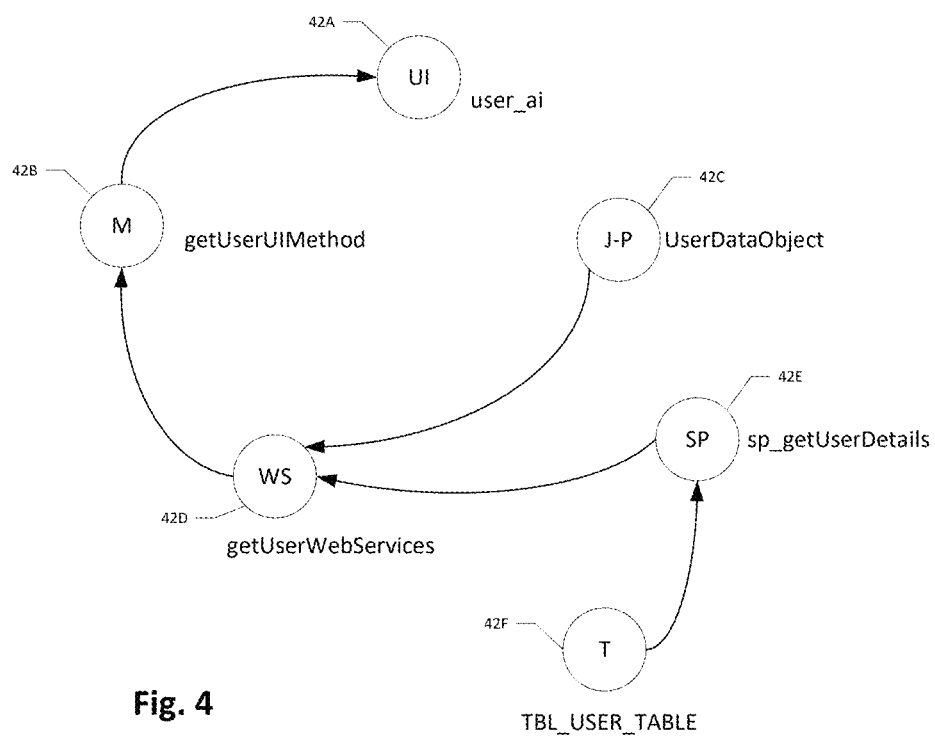
FIG. 4 depicts an example of a graph generated from the example set of nodes of FIG. 3 according to various embodiments of the present invention.

FIG. 4 illustrates an example of a graph constructed, by the graph construction computer system 50, for the nodes identified by the LLM 40. The graph may use some sort of notation to readily identify visually the different node types, such as color coding or written notations as in the example of FIG. 4 or something visual identifier means. In the example of FIG. 4, the table node 42F is indicated by the notation "T," the stored procedure node 42E is indicated by the notation "SP," and so on. Each node can also be labeled by the name for the node. And the arrows indicate the other nodes that a target node depends on. For example, the arrow from node 42B to node 42A indicates that user interface represented by node 42A depends on the method of node 42B. Of course, the example of FIGS. 3 and 4 are relatively simple for illustrative purposes. The graph for a complex software system could have many different nodes of each type, and much more intricate dependencies than illustrated in the example of FIG. 4. Also, a web server, such as part of the graph computer system 50, could host a web site that serves/displays the graph for an end user.

In addition to name, node type, and dependencies, the LLM 40 could discern other aspects of the nodes, such as for example "data," which can refer to, for example, variable names or column names used by a table or stored procedure, for example. For the sake of simplicity, the example of FIG. 3 does not list the data for each of the depicted nodes.

As mentioned above, the prompts may direct the LLM 40 to generate the nodes in a text format, such as JSON. FIG. 5 is an example of the JSON text that the LLM 40 could generate for nodes 42E and 42F, as examples. The JSON text indicates for each node indicates, for example, its node type, its node name, what the node depends on, and its data (if any) (e.g., User_ID and User_name in the example for node 42E).

As mentioned before, the prompts 32, 34, 36, 38 can be programming-language specific. A user (e.g. via the user computing device 6) could select, such as from a web interface, for upload to the LLM 40 (i) the code in the code repository 20 of the software system to be analyzed by the LLM 40 and (ii) the prompts in the prompt library that go with each piece of code based on the programming language of the code. That is, for example, for UI code written in Angular, the user could select the Angular prompts 38; for a Java program the user could select the Java prompts 34, and so on. The LLM 40 can use the selected prompts as directives for analyzing the corresponding code of the software system.

The prompts serve as tailored instructions that enable the LLM 40 to precisely understand and analyze code across various programming languages. The prompts are preferably written to ensure that the LLM 40 provides exact information required to meet specific analysis requirements, particularly when dealing with complex dependencies and relationships within programs. Each programming language has its own syntax, semantics, and idiomatic expressions. Language-specific prompts provide precise instructions to the LLM 40, ensuring that they interpret and analyze the code accurately, which is important for tasks such as dependency analysis, where understanding the nuances of a language can significantly impact the results. The prompts can be curated meticulously in a process that involves understanding the intricacies of each language. This ensures that the LLM 40 can deliver the exact information required, particularly when analyzing dependencies and relationships derived from reverse engineering code. This preferably includes understanding call flows and data flows within programs, which are often complex and language-specific.

Custom-built prompts can be designed to extract both semantic and syntactic information from the code. This dual extraction aids the LLM 40 in performing accurate analysis, as it allows the LLM 40 to comprehend not just the structure of the code, but also its meaning and intent, which can be important when dealing with languages that have unique constructs or paradigms.

The prompt library 30 is also preferably crafted to support a wide range of programming languages, including Angular, Java, SQL, Oracle, Cobol, and Assembly. Each of these languages presents its own set of challenges and opportunities for analysis. For instance, Cobol and Assembly may require a focus on legacy code structures, while Angular and Java might emphasize modern software architecture and design patterns. In reverse engineering scenarios, understanding the relationships and dependencies within code is critical. Language-specific prompts guide the LLM 40 in identifying these relationships, whether they are derived from call flows, data flows, or other programmatic interactions. This capability is aids tasks such as refactoring, optimization, and security analysis.

Crafting effective prompts can begin by thoroughly understanding the constructs and paradigms of the target language. This includes syntax, control structures, data types, and common libraries or frameworks of the target languages. Key areas of analysis that are required to be performed by the LLM should also be determined, such as dependency analysis, data flow tracking, or call hierarchy mapping. The prompts can be tailored to focus on these areas. For example, depending on the programming language, the prompts can direct the LLM to infer dependencies between function components of the software system based on, for example, detection in the code of calls (including API calls), database queries, or imports based on syntactic parsing.

The programming-language-specific prompts are preferably structured to extract both syntactic and semantic insights. Prompts may include, for example:
Lexical Queries, such as 'Identify all function definitions and their return types in this JavaScript file';
Structural Queries, such as 'Analyze this SQL stored procedure and identify referenced tables and column dependencies';
Control Flow Queries, such as 'Trace execution from this main entry function and list all callable functions within this Python script'; and
Security-Aware Queries, such as 'Identify hardcoded credentials or unsecured API calls in this code snippet'.

The prompts can also be refined iteratively based on feedback and results. This ensures continuous improvement and adaptation to new language features or analysis requirements. Also, collaboration with programming language experts can be utilized to ensure that prompts capture the nuances and subtleties of each language, enhancing the accuracy and reliability of the analysis. By emphasizing the importance of language-specific prompts and dedicating effort to their curation, organizations can harness the full potential of LLMs for precise and insightful code analysis. This approach not only improves the accuracy of dependency and relationship analysis but also enhances the overall understanding of complex software systems.

Referring back to FIG. 2, the system 7 can follow a three-tier architecture, comprising: a frontend layer that implements a web-based UI for user interaction, visualization, and querying, which can be built using frameworks such as React, Vue.js, or Angular; a backend layer that hosts the API gateway, prompt library, and dependency analysis services, and which may use Python (Flask/FastAPI) or Node.js (Express), for example; and a data storage layer that can comprise the code repository 20, such as a version-controlled database (e.g., GitHub, Bitbucket) storing the software source code; the prompt library 30, which can comprise a structured database (e.g., PostgreSQL, MongoDB) storing predefined and user-defined LLM prompts; and a graph database, implemented, for example, as a storage system for maintaining dependency graphs, supporting complex queries and visualization. The frontend can communicate with the backend via RESTful or GraphQL APIs, which in turn can trigger the LLM for code analysis and graph generation. The processed results can be stored and indexed for efficient retrieval.

The example of FIG. 6 shows a transformer based LLM model, which is a type of neural network architecture designed for natural language processing (NLP) tasks and which could be used for the LLM 14. The key components of a transformer model include an encoder-decoder architecture, a self-attenuation mechanism, a feed-forward neural network (FFNN), positional encoding, and layer normalization and residual connections. Tokens are the basic units of input that a transformer network, such as the transformer network of FIG. 6, processes. They can represent words, subwords, characters, or other elements, depending on the tokenization method used. Tokens are discrete elements that the model uses to understand and generate text. They are numerical representations of the textual data that the model processes. Tokens come from a process called tokenization, which converts raw text into a sequence of tokens. After tokenization, tokens are usually converted into numerical representations (token IDs) that the model can process. This is done using a vocabulary, which maps each token to a unique integer. These token IDs are then transformed into dense vectors (embeddings) that capture semantic information. Embeddings are high-dimensional representations where tokens with similar meanings are located close to each other in the vector space.

The encoder 112 can take an input sequence and transforms it into a sequence of continuous representations. An input embedding layer 114 can convert words or tokens into dense vectors of fixed size. Positional encoding 116 can add information about the position of each token in the sequence since the model does not inherently understand order. These encodings are added to the input embeddings. A self-attention mechanism 118 allows the model to focus on different parts of the input sequence when encoding a particular token. It calculates a weighted sum of the input values, where the weights are determined by the similarity between the token being processed and other tokens in the sequence. A feed-forward neural network (FFNN) 120 can apply a two-layer fully connected network to the output of the self-attention mechanism. Each sub-layer (e.g., self-attention and FFNN) is followed by a residual connection (adding the input of the sub-layer to its output) and layer normalization to stabilize and speed up training.

The decoder 122 takes the encoder's output and generates the output sequence, one token at a time. Similar to the encoder, an output embedding layer 123 and positional encoding 124 converts output tokens into dense vectors and adds positional information. A masked self-attention mechanism 126 ensures that the prediction for a particular token depends only on the known outputs up to that position (i.e., the model cannot "cheat" by looking ahead). An encoder-decoder attention layer 128 allows the decoder to focus on relevant parts of the input sequence (the encoder's output) when generating each token of the output sequence. An output/decoder feed-forward neural network (FFNN) 130, similar to the encoder FFNN 120, applies a two-layer fully connected network to the output of the attention mechanism 128. Residual connections and layer normalization can be applied in the same manner as in the encoder.

Encodings in the transformer refer to the representations of tokens at various stages. The input embeddings comprise initial dense vector representations of the input tokens. The positional encodings are added to input embeddings to incorporate position information. Contextualized encodings are the representations produced by the self-attention and FFNN layers, which capture the context of each token in the sequence.

Attention allows the model to focus on different parts of the sequence when processing a token. It can involve Query (Q), Key (K), and Value (V) matrices that are derived from the input embeddings by multiplying them with learned weight matrices. Scaled dot-product attention can calculate attention scores by taking the dot product of the Query and Key matrices, scaling them down, and applying a softmax function to get the attention weights. These weights are then used to compute a weighted sum of the Value matrix, producing the attention output.

The softmax function 132 can covert the attention scores into probabilities, ensuring that they sum to one. In the context of attention, the softmax function 132 ensures that the attention weights highlight the most relevant tokens while maintaining a probabilistic interpretation.

The LLM 40 could also be adapted for a particular domain or context, such as a domain(s) specific to the enterprise, via fine tuning of the LLM 40, which adjusts the pre-trained LLM's weights using domain-specific data to make it more effective for particular applications. Fine tuning can involve collecting a large and diverse dataset relevant to the specific domain or context. For example, for a financial services application, materials describing the financial services and/or the products of the financial services could be used. This adaptation training data can be tokenized into smaller units (tokens) that the LLM 40 can process. The tokenization of the adaptation training data can use the same tokenization method as the base model of the LLM 40. The fine-tuning process can involve supervised fine-tuning (e.g. labeled data) where possible. The model is then trained on the domain-specific data, typically under supervised learning techniques. Fine-tuning can be done using frameworks like Hugging Face's Transformers library, TensorFlow, or PyTorch. The fine tuning can involve conventional hyperparameter adjustments and validation of the model's performance.

The LLM can generate text (e.g., code in the target programming language) using a sophisticated next-word prediction mechanism. The model can be trained on a vast dataset of text from various sources. During training, it learns patterns, structures, and the statistical relationships between words and phrases in the text. This training process involves adjusting the model's parameters to minimize the error in predicting the next word in a sequence of text. When given a prompt and/or initial text, the model analyzes the context using its learned patterns. It takes into account the words and phrases that have already been provided to understand the context and meaning. Based on the context, the model generates a probability distribution over the potential next words. It uses this distribution to predict the most likely next word. This process is repeated word by word to generate coherent and contextually relevant text (e.g., software code). The model can use different strategies to choose the next word from the probability distribution. Common strategies include greedy sampling (choosing the word with the highest probability), top-k sampling (limiting the choices to the top k most probable words and sampling from them), top-p (nucleus) sampling (choosing words from the smallest set whose cumulative probability exceeds a certain threshold (p)), and/or temperature (adjusting the randomness of the predictions, where a lower temperature makes the model more conservative, while a higher temperature makes it more creative and diverse). The model repeats the process, using the newly generated word as part of the context for predicting the next word, continuing this until the desired length of text is generated or until it encounters a stopping condition (like a specific token indicating the end).

The software analysis system of the present invention can be particularly beneficial in the context of legacy system modernization, where traditional expertise may be waning. By providing a detailed mapping of old systems, the present invention can aid in smoother transitions to modern architectures by identifying obsolete components and suggesting potential modernization paths, thereby significantly reducing the time and effort required for system upgrades.

Embodiments of the present invention can also significantly reduce the need for language-specific SMEs by automating the interpretation, analysis, and management of diverse programming languages within software applications. This automation is achieved through the integration of advanced Generative LLMs, which are capable of understanding and processing code written in multiple languages. As a result, organizations can allocate human resources more strategically, focusing on innovation and development rather than routine maintenance.

The system can provide a holistic and detailed view of an application's operation, which is crucial for effective maintenance and feature development. By generating visual representations of software architectures, the present invention can aid developers in identifying potential issues, optimizing system performance, and ensuring code quality. This enhanced understanding is facilitated by the LLM's ability to generate insights from complex codebases, offering a level of clarity that is often difficult to achieve manually.

The present invention can also support the modernization of legacy systems by delivering clear, actionable insights into outdated architectures. By analyzing and mapping legacy code structures, the system can enable more informed decision-making regarding updates and transitions. This capability can streamline modernization efforts, reducing both time and cost. The system can also assist in identifying redundant or obsolete components, thereby simplifying the transition to more modern architectures.

The system can also be highly scalable and adaptable, capable of handling software applications of varying sizes and complexities. The prompts, for example, can be customized to meet the specific needs of different organizations, ensuring that the solution remains relevant as technological landscapes evolve.

The graph construction computer system 50 can be implemented using one or more network-connected computing devices that are responsible for processing dependency data generated by the LLM 40 and constructing a structured, directed graph representing the relationships between functional components of the software system. This system can be deployed in a variety of computing environments, including on-premises data centers, cloud-based platforms, or hybrid configurations that integrate both local and cloud computing resources. At the hardware level, the graph construction system 50 may comprise of a single high-performance server or a distributed cluster of networked machines capable of handling large-scale graph processing tasks. Each computing device can include: multi-core processors (CPUs) such as Intel Xeon or AMD EPYC chips for general-purpose computation; Graphics Processing Units (GPUs) or Tensor Processing Units (TPUs), which may be used to accelerate graph computations and optimize dependency analysis; high-speed RAM (e.g., DDR5 or HBM memory) to store graph structures temporarily during processing; and persistent storage (e.g., SSDs or NVMe drives) for storing graph representations, logs, and dependency data for long-term retrieval. If implemented in a cloud-based architecture, the system 50 may leverage auto-scaling compute instances, containerized workloads (Docker/Kubernetes), and serverless computing resources (e.g., AWS Lambda, Google Cloud Functions) to dynamically allocate computing power as needed.

The software layer of the graph construction system 50 can comprise a graph processing engine, which can provide the core logic responsible for building the directed graph based on labeled graph nodes received from the LLM. The graph processing engine can be implemented using graph processing frameworks such as Apache TinkerPop, NetworkX, GraphX (Apache Spark), or Neo4j, and utilize graph traversal algorithms (e.g., breadth-first search, depth-first search) to detect relationships and dependencies. A graph storage and retrieval system can stores the generated graph in a graph database, such as Neo4j, ArangoDB, or Amazon Neptune. It can supports querying and indexing to allow users to search for dependencies, impact analyses, or security vulnerabilities. If using a relational database, the system can store nodes and edges as relational tables (e.g., PostgreSQL, MySQL).

The graph construction computer system 50 can also comprise a web server and visualization layer. The web server (e.g., Node.js, Flask, FastAPI, or Spring Boot) can provide, for example, a RESTful or GraphQL API to serve graph data. A frontend visualization engine (built with D3.js, Cytoscape.js, or WebGL) can render the directed graph dynamically in a browser-based UI, allowing users to interact with the graph, filtering dependencies, zooming in on specific nodes, and viewing metadata. Developers, software architects, and security analysts can access the graphs via a web-based dashboard.

The LLM 40 could be tailored to the domain of the enterprise. For example, the enterprise could be a financial services firm and the LLM's could be tailored to the domain of financial products or some other suitable domain(s). To tailor the LLM to the domain of the enterprise, the model must be adapted to understand the enterprise's specialized terminology, workflows, regulations, and data structures. This process involves training and fine-tuning the model using domain-specific data, ensuring that it can generate insights, answer questions, and assist in decision-making with a high degree of accuracy and relevance. This process can involve the step of data collection and preprocessing, in which the enterprise gathers extensive datasets, including, in the example of a financial services firm, financial reports, regulatory filings, transaction records, market data, internal policies, and customer interactions. These datasets can be cleaned, formatted, and tokenized to be compatible with the LLM's training framework. If the enterprise handles sensitive financial data, privacy-preserving techniques, such as differential privacy and data anonymization, may be applied to protect confidential information.

Once the data is prepared, the enterprise can proceed with fine-tuning the LLM to incorporate industry-specific knowledge. Fine-tuning can involve training the model on labeled datasets where the expected outputs are known, enabling the model to improve its performance in particular enterprise-specific applications. This process typically uses deep learning frameworks such as TensorFlow or PyTorch and optimization algorithms like AdamW to adjust the model's parameters. The fine-tuning stage helps the LLM understand jargon of the enterprise, interpret complex documents, and generate responses that align with industry practices. To further improve performance, the enterprise could integrate retrieval-augmented generation (RAG) techniques, where the LLM retrieves and references external financial data sources in real-time. This allows the model to incorporate up-to-date information, regulatory changes, or company reports into its responses, improving accuracy and reducing outdated or incorrect outputs.

In one general aspect, therefore, the present invention is directed to computer-implemented methods and computer systems for analyzing program and data flows in a software system of an enterprise, where the software system comprises code written in multiple programming languages. In various embodiments, the method comprises the step of receiving, by a backend computer system, source code from a code repository, where the source code is for the software system and includes code written in at least two different programming languages. The method also comprises the step of selecting, by a user via a front-end interface, programming-language-specific prompts from a prompt library, where the prompt library comprises a plurality of predefined prompts tailored to different programming languages. The method also comprises the step of processing, by a generative large language model (LLM) executed on the backend computer system, the received source code using the selected prompts to generate a plurality of labeled graph nodes, where each labeled graph node represents a functional component of the software system and comprises a node type, a node name, and, for each functional component of the software system dependent on one or more other labeled graph nodes, dependency information for the node corresponding to the functional component. The dependency information identifies the one or more other labeled graph nodes on which the functional component depends. The method also comprises the step of generating, by a graph construction computer system, a directed graph based on the plurality of labeled graph nodes, where each labeled graph node is represented as a node in the directed graph, and where directed edges between the nodes are established based on the dependency information. The method also comprises the step of providing, via the front-end interface, a visual representation of the directed graph to the user, thereby enabling analysis of program and data flows across the software system independent of the programming languages in which the code of the software system is written.

A computer system according to embodiments of the present invention can comprise: a code repository storing source code for the software system and including code written in at least two different programming languages; a prompt library storing a plurality of predefined prompts tailored to different programming languages; and a backend computer system in communication with the code repository and the prompt library. The backend computer system comprises a generative LLM, where the LLM is directed by user-selected programming-language-specific prompts from the prompt library to generate a plurality of labeled graph nodes, where each labeled graph node represents a functional component of the software system and comprises a node type, a node name, and, for each functional component of the software system dependent on one or more other labeled graph nodes, dependency information for the node corresponding to the functional component. The dependency information identifies the one or more other labeled graph nodes on which the functional component depends. The computer system also comprises a graph construction computer system in communication with the LLM. The graph construction computer system is programmed to generate a directed graph based on the plurality of labeled graph nodes, where each labeled graph node is represented as a node in the directed graph, and where directed edges between the nodes are established based on the dependency information. The graphic construction computer system is also programmed to provide a visual representation of the directed graph to a user, thereby enabling analysis of program and data flows across the software system independent of the programming languages in which the code of the software system is written.

In various implementations, each functional component of the software system comprises an identifiable unit of the source code for the software system that performs a distinct function within the software system, and where each functional component operates within a defined scope and adheres to syntactic and semantic rules of its respective programming language. At least one of the functional components can be a UI, a method, a program in a specific programming language, a web service, a stored procedure, or a table.

In various implementations, the programming-language-specific prompts comprise a first set of Java specific prompts and a second set of SQL specific prompts. The programming-language-specific prompts can further comprise a third set of programming-language-specific prompts, where the programming language for the third set of programming-language-specific prompts is Angular, COBOL, or Assembly.

In various implementations, the programming-language-specific prompts direct the LLM to generate the plurality of labeled graph nodes as JSON text in a JSON text file.

In various implementations, the LLM comprises a transformer.

In various implementations, the method further comprises training the LLM by tailoring the LLM to a domain of the enterprise. The enterprise can comprise a financial services firm and the domain comprises financial products.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for analyzing program and data flows in a software system of an enterprise, wherein the software system comprises code written in multiple programming languages, the method comprising:
   receiving, by a backend computer system, source code from a code repository, wherein the source code is for the software system and includes code written in at least two different programming languages;
   selecting, by a user via a front-end interface, programming-language-specific prompts from a prompt library, wherein the prompt library comprises a plurality of predefined prompts tailored to different programming languages;
   processing, by a generative large language model (LLM) executed on the backend computer system, the received source code using the selected prompts to generate a plurality of labeled graph nodes, wherein each labeled graph node represents a functional component of the software system and comprises:
     a node type;
     a node name; and
     for each functional component of the software system dependent on one or more other labeled graph nodes, dependency information for the node corresponding to the functional component, wherein the dependency information identifies the one or more other labeled graph nodes on which the functional component depends;
   generating, by a graph construction computer system, a directed graph based on the plurality of labeled graph nodes, wherein:
     each labeled graph node is represented as a node in the directed graph, and
     directed edges between the nodes are established based on the dependency information; and
   providing, via the front-end interface, a visual representation of the directed graph to the user, thereby enabling analysis of program and data flows across the software system independent of the programming languages in which the code of the software system is written.

2. The method of claim 1, wherein each functional component of the software system comprises an identifiable unit of the source code for the software system that performs a distinct function within the software system, and wherein each functional component operates within a defined scope and adheres to syntactic and semantic rules of its respective programming language.

3. The method of claim 2, wherein at least one functional component is a functional component selected from the group consisting of a UI, a method, a program in a specific programming language, a web service, a stored procedure, and a table.

4. The method of claim 3, wherein the programming-language-specific prompts comprise a first set of Java specific prompts and a second set of SQL specific prompts.

5. The method of claim 4, wherein the programming-language-specific prompts comprise a third set of programming-language-specific prompts, wherein the programming language for the third set of programming-language-specific prompts comprises a programming language selected from the group consisting of Angular, COBOL, and Assembly.

6. The method of claim 4, wherein the programming-language-specific prompts direct the LLM to generate the plurality of labeled graph nodes as JSON text in a JSON text file.

7. The method of claim 1, wherein the LLM comprises a transformer.

8. The method of claim 1, further comprising training the LLM, wherein training the LLM comprising tailoring the LLM to a domain of the enterprise.

9. The method of claim 8, wherein the enterprise comprises a financial services firm and the domain comprises financial products.

10. A computer system for analyzing program and data flows in a software system of an enterprise, wherein the software system comprises code written in multiple programming languages, the computer system comprising:
   a code repository storing source code for the software system and including code written in at least two different programming languages;
   a prompt library storing a plurality of predefined prompts tailored to different programming languages;
   a backend computer system in communication with the code repository and the prompt library, wherein the backend computer system comprises a generative LLM, wherein the LLM is directed by user-selected programming-language-specific prompts from the prompt library to generate a plurality of labeled graph nodes, wherein each labeled graph node represents a functional component of the software system and comprises:
      a node type;
      a node name; and
      for each functional component of the software system dependent on one or more other labeled graph nodes, dependency information for the node corresponding to the functional component, wherein the dependency information identifies the one or more other labeled graph nodes on which the functional component depends; and
   a graph construction computer system in communication with the LLM, wherein the graph construction computer system is programmed to:
      generate a directed graph based on the plurality of labeled graph nodes, wherein:
         each labeled graph node is represented as a node in the directed graph; and
         directed edges between the nodes are established based on the dependency information; and
      provide a visual representation of the directed graph to a user, thereby enabling analysis of program and data flows across the software system independent of the programming languages in which the code of the software system is written.

11. The computer system of claim 10, wherein each functional component of the software system comprises an identifiable unit of the source code for the software system that performs a distinct function within the software system, and wherein each functional component operates within a defined scope and adheres to syntactic and semantic rules of its respective programming language.

12. The computer system of claim 10, wherein at least one functional component is a functional component selected from the group consisting of a UI, a method, a program in a specific programming language, a web service, a stored procedure, and a table.

13. The computer system of claim 12, wherein the programming-language-specific prompts comprise a first set of Java specific prompts and a second set of SQL specific prompts.

14. The computer system of claim 13, wherein the programming-language-specific prompts comprise a third set of programming-language-specific prompts, wherein the programming language for the third set of programming-language-specific prompts comprises a programming language selected from the group consisting of Angular, COBOL, and Assembly.

15. The computer system of claim 13, wherein the programming-language-specific prompts direct the LLM of the backend computer system to generate the plurality of labeled graph nodes as JSON text in a JSON text file.

16. The computer system of claim 10, wherein the LLM comprises a transformer.

\* \* \* \* \*